United States Patent
Aposhian et al.

(10) Patent No.: US 11,304,386 B2
(45) Date of Patent: Apr. 19, 2022

(54) SOD ROLL STACKING HEAD

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Seth W. Jeppson, Clearfield, UT (US); Mark C. LeBlanc, Salt Lake City, UT (US); Austin J. Neuner, Layton, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 493 days.

(21) Appl. No.: 16/379,251

(22) Filed: Apr. 9, 2019

(65) Prior Publication Data
US 2020/0323153 A1 Oct. 15, 2020

(51) Int. Cl.
*A01G 20/15* (2018.01)
*B65G 57/24* (2006.01)
*B65G 57/03* (2006.01)

(52) U.S. Cl.
CPC .............. *A01G 20/15* (2018.02); *B65G 57/03* (2013.01); *B65G 57/24* (2013.01)

(58) Field of Classification Search
CPC ...... A01G 20/15; A01G 20/00; A01D 87/003; A01D 87/127; A01D 90/08; B65G 57/03; B65G 57/24
See application file for complete search history.

(56) References Cited

U.S. PATENT DOCUMENTS

| 85,437 | A | * | 12/1868 | Elliott | A01D 87/003 294/121 |
| 2,205,550 | A | * | 6/1940 | Wehr | B66C 13/00 294/81.6 |
| 4,583,900 | A | * | 4/1986 | Cooley | A01D 87/127 294/121 |
| 4,604,018 | A | * | 8/1986 | Kruse | A01D 90/08 198/374 |

(Continued)

FOREIGN PATENT DOCUMENTS

FR 2766504 A1 1/1999

OTHER PUBLICATIONS

Firefly Automatix, "FireFly Automatix R300 Automated Roll Harvester," Jun. 12, 2020, Online, <https://fireflyequipment.com/R300/>.

(Continued)

*Primary Examiner* — Thomas B Will
*Assistant Examiner* — Joel F. Mitchell
(74) *Attorney, Agent, or Firm* — Kirton McConkie; Brian Tucker

(57) ABSTRACT

A stacking head for stacking rolls of sod can include a number of screw assemblies that are employed to secure and remove sod rolls from a stacking conveyor. Each screw assembly can include a center stake and a corkscrew that pierce a roll as the stacking head is forced into the roll. The rate at which the stacking head is moved vertically relative to the roll can be synchronized with the rate at which each screw assembly is rotated. This synchronization ensures that the corkscrew will pass into the roll while the stacking head is simultaneously forced into the roll without damaging the delicate sod.

18 Claims, 12 Drawing Sheets

(56) References Cited

U.S. PATENT DOCUMENTS

| | | | | |
|---|---|---|---|---|
| 4,983,087 A | * | 1/1991 | Mierek | A01D 87/003 |
| | | | | 294/121 |
| 5,217,078 A | * | 6/1993 | Zinn | A01G 20/15 |
| | | | | 172/19 |
| 6,263,616 B1 | | 7/2001 | Hummer | |
| 2007/0034393 A1 | | 2/2007 | Hendriks et al. | |
| 2016/0278273 A1 | | 9/2016 | Aposhian et al. | |
| 2017/0367270 A1 | | 12/2017 | Brouwer et al. | |
| 2019/0037759 A1 | | 2/2019 | Aposhian et al. | |
| 2019/0230872 A1 | | 8/2019 | Aposhian et al. | |

OTHER PUBLICATIONS

International Searching Authority, International Search Report and the Written Opinion, dated Jul. 17, 2020.

* cited by examiner

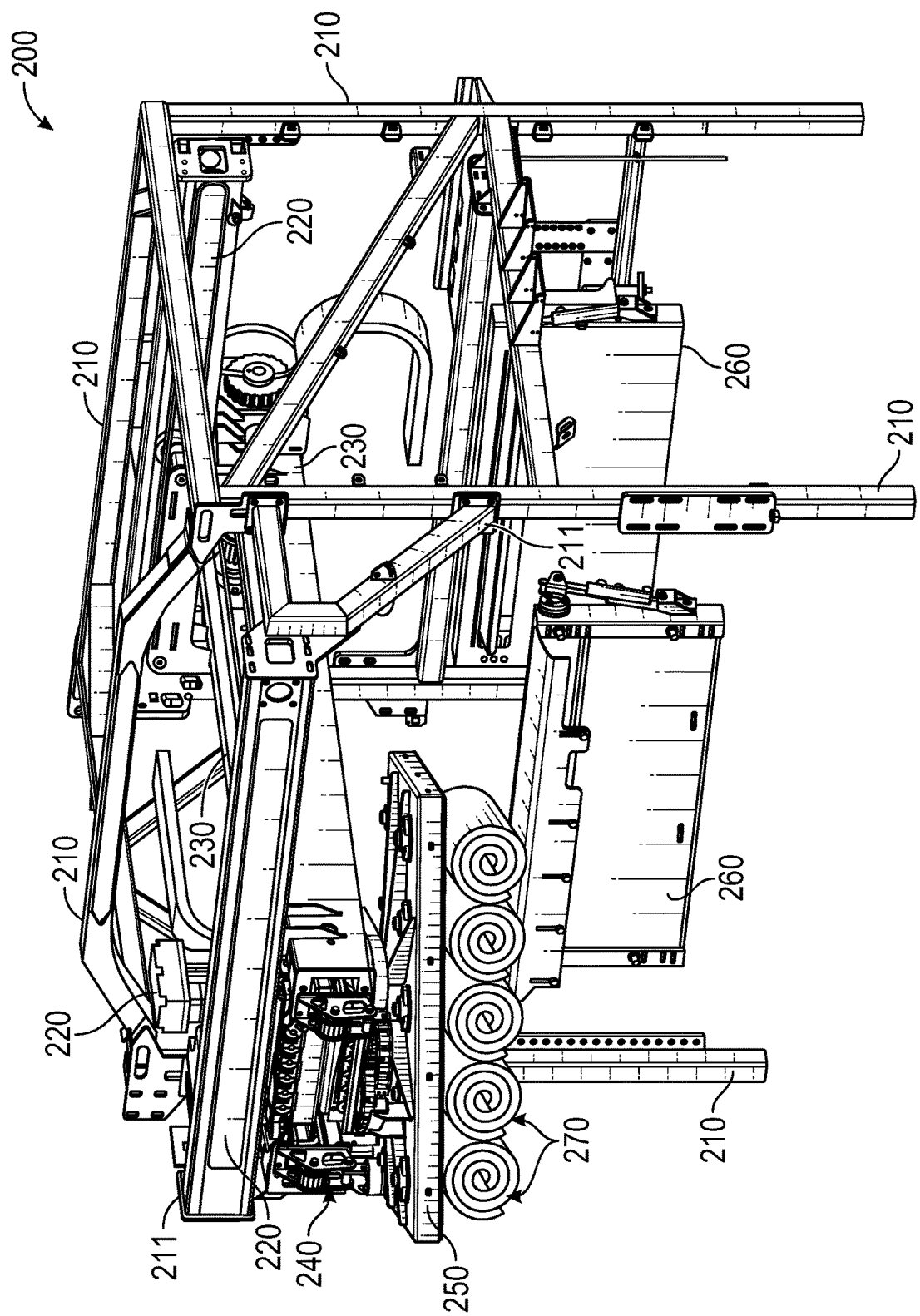

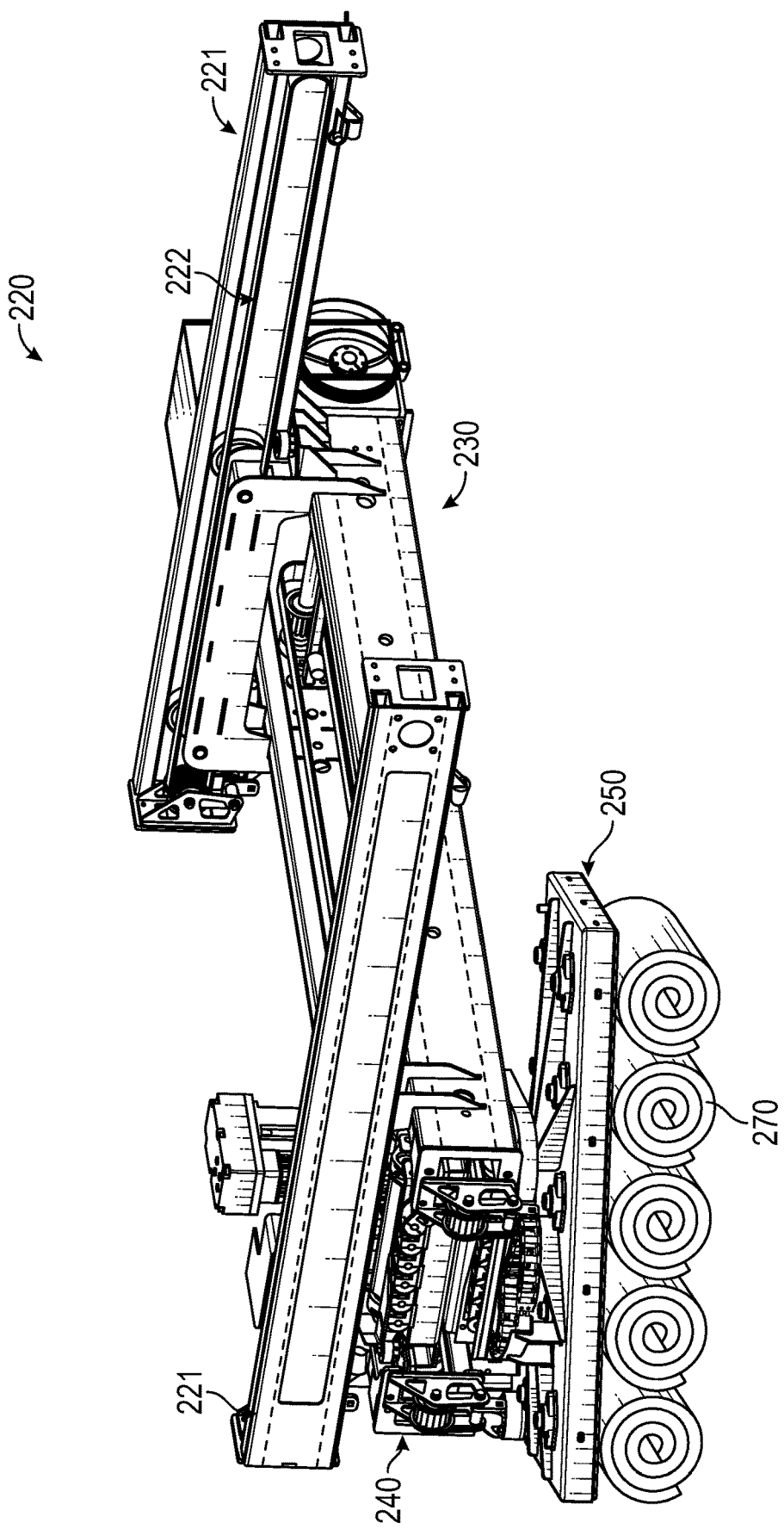

SOD ROLL STACKING HEAD

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

Two general types of harvesters exist: slab harvesters; and roll harvesters. A roll harvester forms the slabs of sod into rolls which are then accumulated on the stacking conveyor for pick up. A slab harvester, on the other hand, directly stacks the slabs in their flat form. Sod harvester 100 represents a slab harvester.

BRIEF SUMMARY

The present invention extends to a stacking head that can be used to stack sod rolls and to methods of operating the stacking head. The stacking head can include a number of screw assemblies that are employed to secure and remove sod rolls from a stacking conveyor. Each screw assembly can include a center stake and a corkscrew that pierce a roll as the stacking head is forced into the roll. The rate at which the stacking head is moved vertically relative to the roll can be synchronized with the rate at which each screw assembly is rotated. This synchronization ensures that the corkscrew will pass into the roll while the stacking head is simultaneously forced into the roll without damaging the delicate sod.

In some embodiments, the present invention is implemented as a method for operating a stacking head of a sod harvester. The stacking head includes a plurality of screw assemblies where each screw assembly comprises a corkscrew. When a plurality of rolls of sod have been accumulated for stacking, the stacking head can be driven towards the rolls of sod at a first rate to cause each corkscrew to pierce one of the rolls of sod. While the stacking head is driven towards the rolls of sod at the first rate, the corkscrews can be driven at a second rate that is synchronized with the first rate such that the corkscrews are advanced into the rolls of sod by both driving the stacking head towards the rolls and rotating the corkscrews.

In other embodiments, the present invention is implemented as stacker assembly for use on a sod harvester to stack rolls of sod. The stacker assembly includes a stacking head that is configured to move vertically relative to a stacking conveyor on which rolls of sod are accumulated. The stacking head includes a plurality of screw assemblies where each screw assembly comprises a corkscrew that extends downwardly from the stacking head. The stacker assembly also includes circuitry for controlling the stacking head. The circuitry is configured to cause the stacking head to be driven towards the rolls of sod at a first rate and to cause each corkscrew to be rotated at a second rate that is synchronized with the first rate such that the corkscrews are advanced into the rolls of sod by both driving the stacking head towards the rolls and rotating the corkscrews.

In other embodiments, the present invention is implemented as a stacking head for a sod harvester. The stacking head includes: a frame; a first actuator that is configured to drive the frame in a vertical direction; a plurality of screw assemblies housed within the frame, each screw assembly comprising a center stake and a corkscrew that is positioned around the center stake; a second actuator that is coupled to each of the screw assemblies, the actuator being configured to rotate the screw assemblies; and control circuitry that is configured to cause the first actuator to drive the frame in the vertical direction at a first rate and to cause the second actuator to rotate the corkscrews at a second rate that is synchronized with the first rate to thereby cause the center stakes and the corkscrews to be advanced into rolls of sod.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a stacker assembly that can be used on a sod harvester to stack rolls;

FIGS. 2A-2C each illustrate isolated portions of the stacker assembly of FIG. 2;

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The axis that extends from the front to the back of a sod harvester will be considered the x axis, the axis that extends from side to side will be considered the y axis, and the vertical axis will be considered the z axis. Typically, sod that is cut from the ground will be transferred on conveyors along the x axis towards a stacking conveyor. A stacking head will then travel along the z axis to remove the sod from the stacking conveyor. Alternatively or additionally, the stacking conveyor could travel along the z axis toward the stacking head. Once the stacking head is secured, the stacking head will then travel along the y axis to release and stack the sod onto a pallet. The stacking head will also typically be configured to rotate so that the sod can be placed on the pallet at different orientations. The term "belt" should be construed as including a chain or any other looped component.

Figure 1:
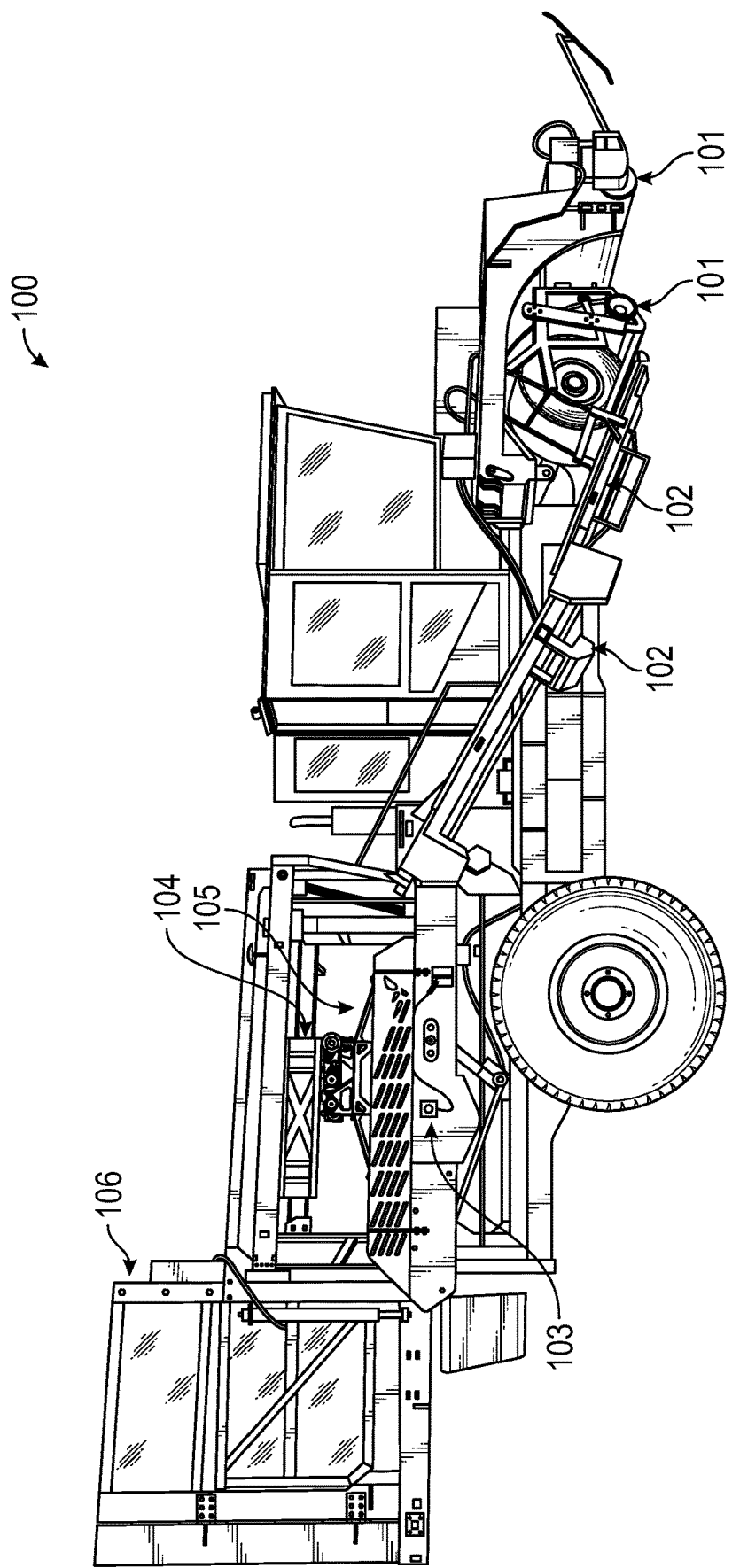
FIG. 1 illustrates a prior art sod harvester that includes a stacking head for stacking slabs of sod.

FIG. 2 illustrates a stacker assembly 200 that can be employed on a sod harvester (e.g., in place of what is shown in FIG. 1). Although not illustrated in the figures, a sod harvester that includes stacker assembly 200 would also include a mechanism for forming sod into rolls. The specific type of roll-forming mechanism is not essential to the present invention.

Stacker assembly 200 includes a frame 210 by which stacker assembly 200 can be coupled to the sod harvester. Frame 210 forms a generally rectangular shape within which a stacking head 250 travels. Opposing hanger brackets 211 extend from one side of frame 210. Although not shown, a stacking conveyor (similar to stacking conveyor 103) would typically be positioned below hanger brackets 211 and would be configured to rotate along the x axis to advance rolls of sod 270 under stacking head 250. Stacker assembly 200 also includes a pallet support assembly 260 which is configured to support a pallet on which rolls 270 can be stacked.

Figure 2B:
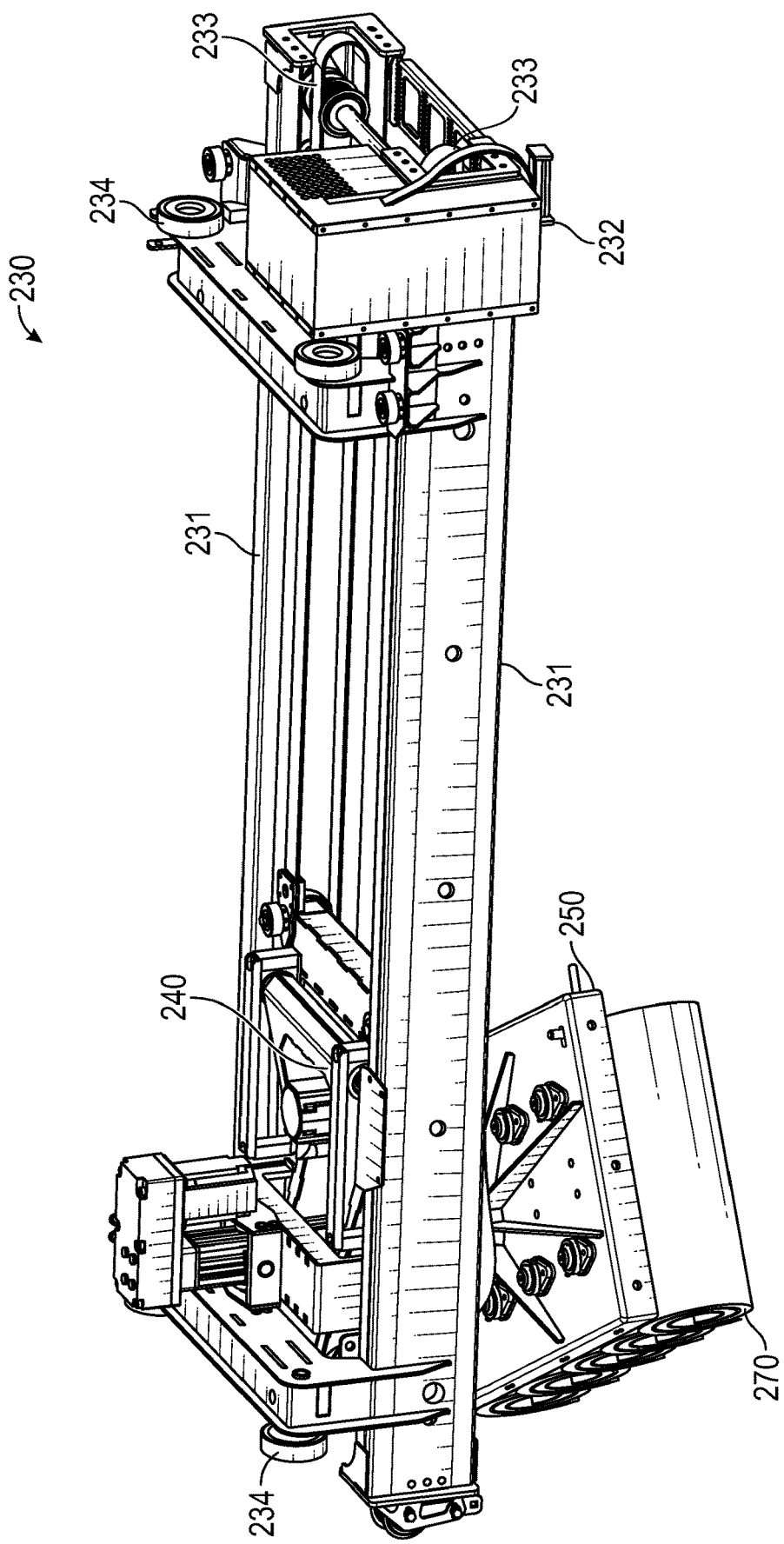
Figure 2C:
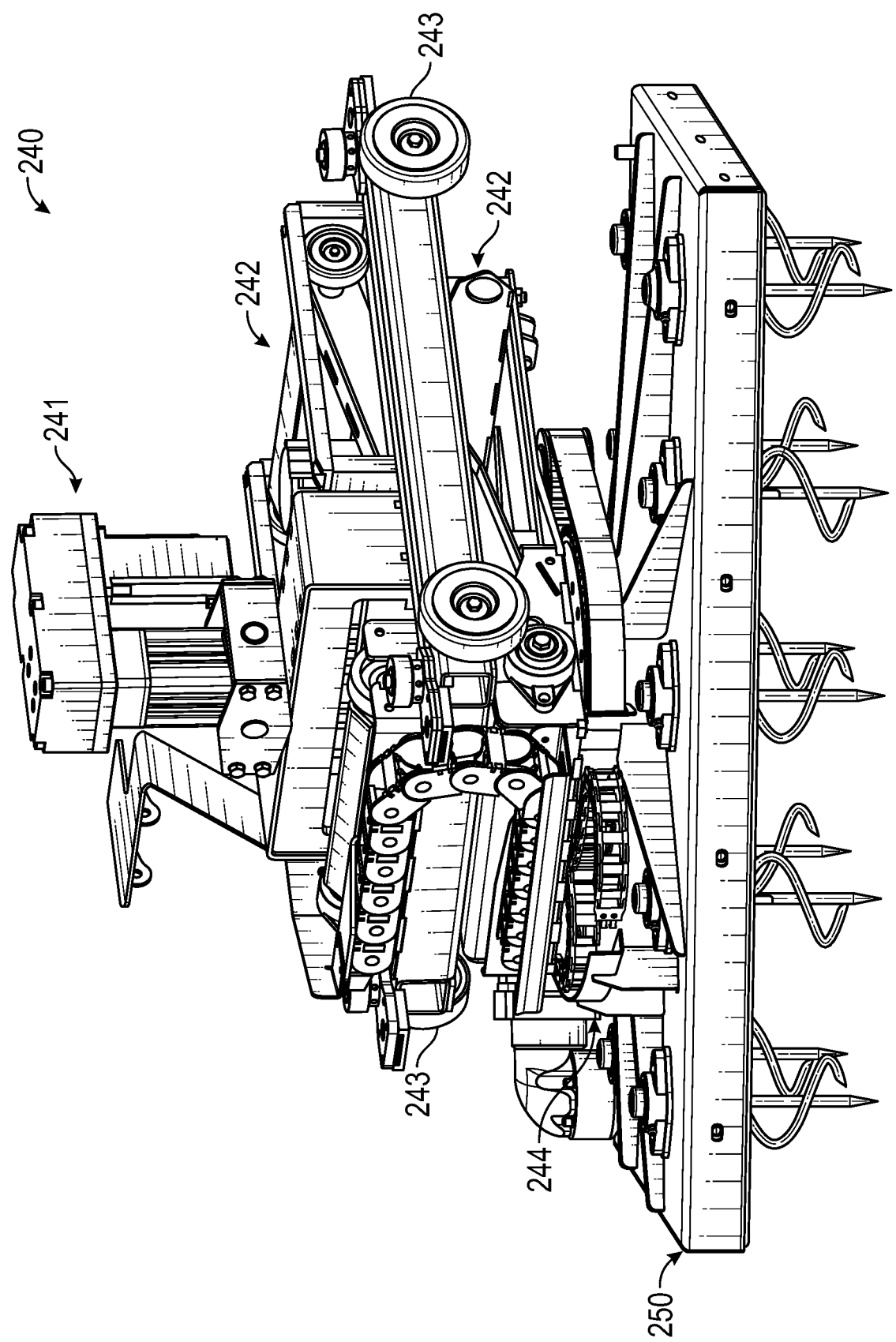

To enable stacking head 250 to move along each of the x, y and z axes, stacker assembly 200 includes an x axis assembly 220, a y axis assembly 230 and a carriage assembly 240 that is configured to move along the z axis and to rotate. FIGS. 2A-2C provided isolated views of these assemblies.

In FIG. 2A, frame 210 has been removed to better illustrate how x axis assembly 220 enables stacking head 250 to be moved along the x axis (i.e., frontward and backward). As shown, x axis assembly 220 includes opposing channel beams 221 which each house a belt 222 by which y axis assembly 230 is moved along the x axis. An actuator (not shown), such as a motor, can be used to drive one or both of belts 222. Each of channel beams 221 forms an inward facing channel within which rollers 234 (see FIG. 2B) of y axis assembly 230 travel.

In FIG. 2B, x axis assembly 220 has been removed to better illustrate how y axis assembly 230 enables stacking head 250 to be moved along the y axis (i.e., side to side). Y axis assembly 230 also includes opposing channel beams 231 which each house a belt 233 by which carriage assembly 240 is moved along the y axis. An actuator 232 (e.g., a motor) can be employed to drive one or both of belts 233. Each of channel beams 231 forms an inward facing channel within which rollers 243 (see FIG. 2C) of carriage assembly 240 travel.

In FIG. 2C, y axis assembly 230 has been removed to illustrate carriage assembly 240. Carriage assembly 240 includes a scissor assembly 242 which is driven by a linear actuator 241 to thereby cause stacking head 250 to travel along the z axis. Carriage assembly 240 also includes a rotational assembly 244 which allows stacking head 250 to be rotated.

Frame 210, x axis assembly 220, y axis assembly 230 and carriage assembly 240 represent only one example of a suitable structure and configuration of stacker assembly 200. Many other mechanisms for allowing stacking head 250 to travel along each of the three axes and to rotate could equally be employed. The present invention should therefore not be limited to any particular configuration of these components of stacker assembly 200. The present invention is directed primarily to the configuration of stacking head 250 and to methods for operating stacking head 250 which facilitate removing rolls from a stacking conveyor and stacking them on a pallet.

Figure 3:
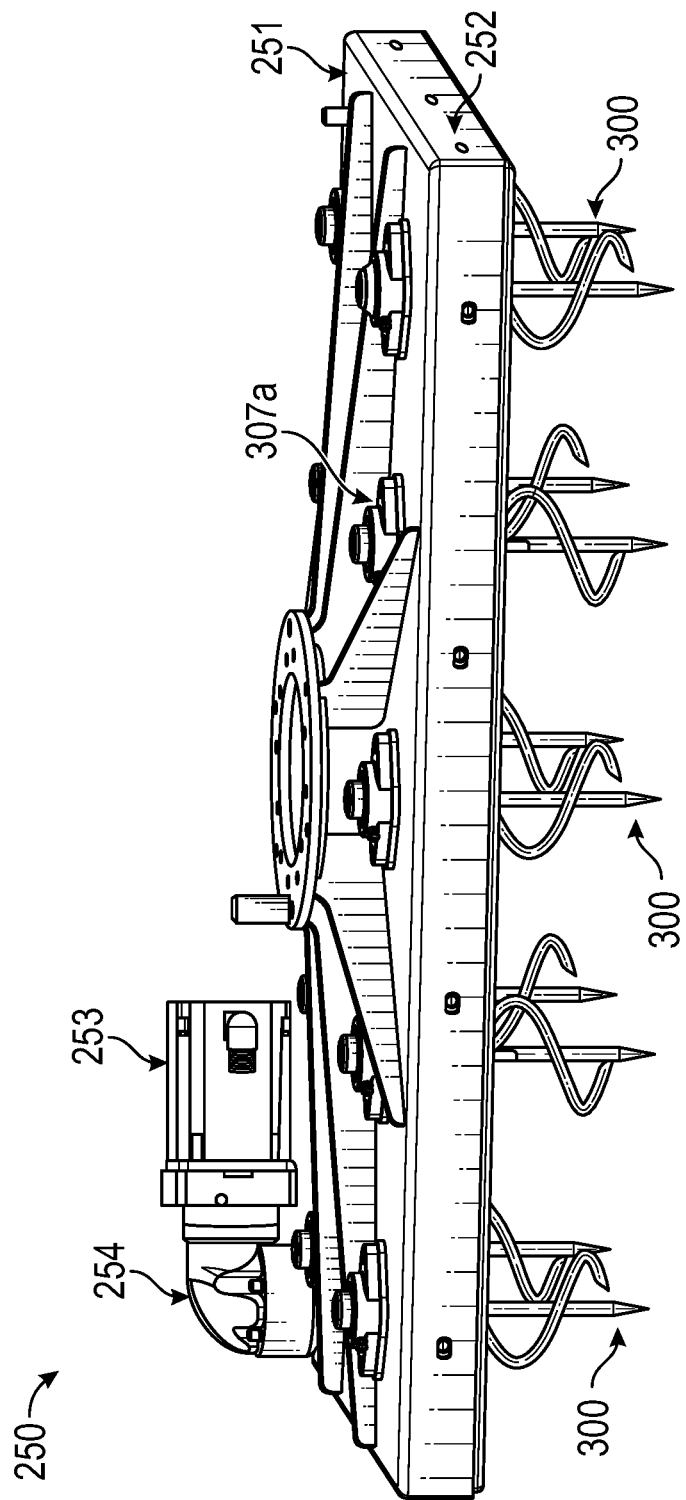
FIG. 3 illustrates the stacking head of the stacker assembly of FIG. 2.

FIG. 3 provides an isolated view of stacking head 250. As shown, stacking head 250 includes an upper frame 251 and a lower frame 252 within which a number of screw assemblies 300 are housed. Screw assemblies 300 are arranged in pairs so that each roll will be secured by a corresponding pair of screw assemblies 300. In the depicted embodiment, there are five pairs of screw assemblies 300 such that stacking head 250 could simultaneously pick up five rolls. In other embodiments, a stacking head could include a different number of screw assemblies. Also, although less desirable, the screw assemblies could be arranged so that a single screw assembly as opposed to a pair of screw assemblies is used to pick up a roll. Stacking head 250 also includes an actuator 253 (e.g., a servo) and a gear box 254 which drive screw assemblies 300.

Figure 3A:
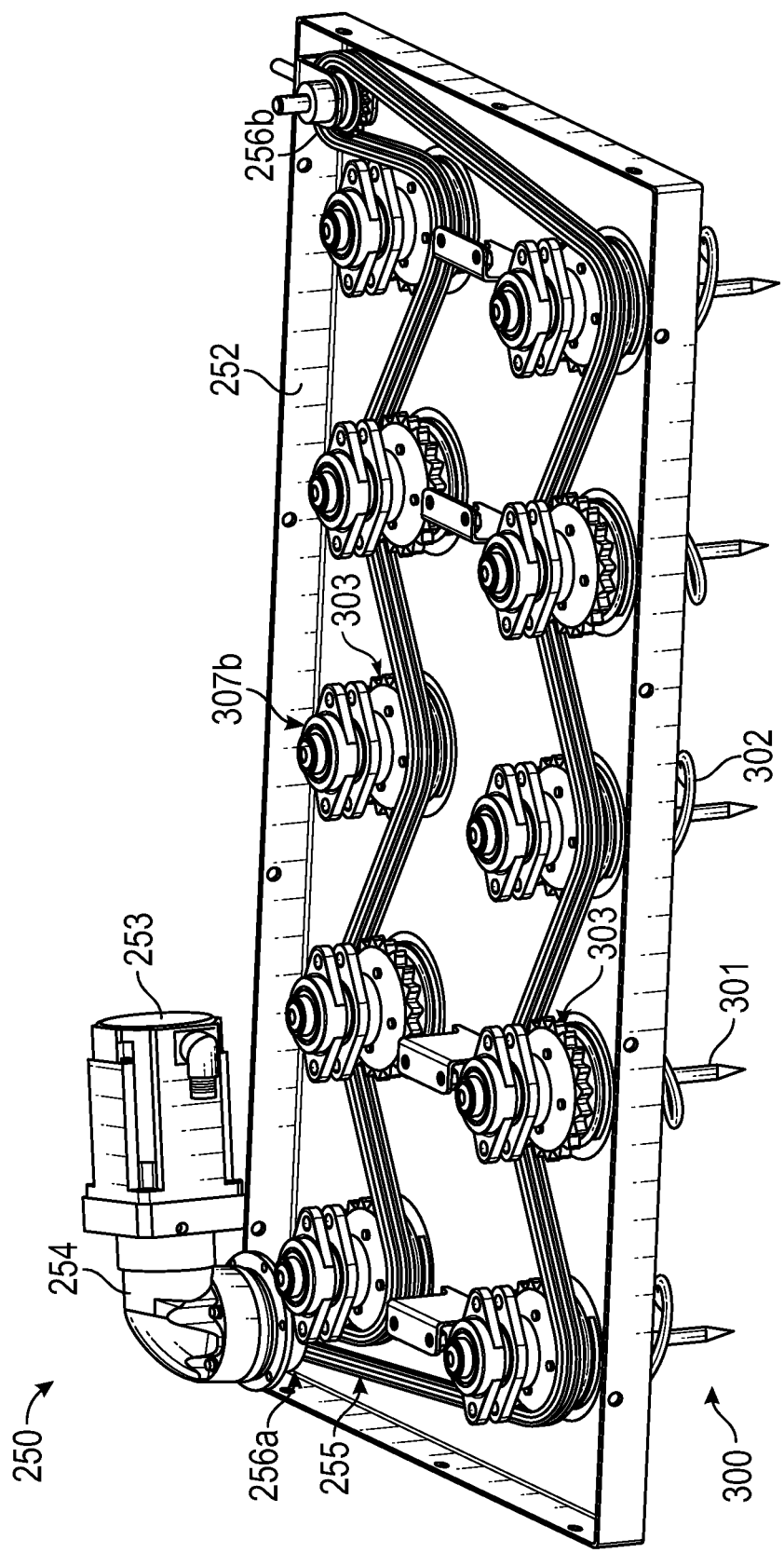
FIG. 3A illustrates the stacking head of FIG. 3 with the upper frame removed.

In FIG. 3A, upper frame 251 has been removed to illustrate how screw assemblies 300 are driven. Each screw assembly 300 includes a sprocket 303. Stacking head 250 also includes sprockets 256a and 256b that are positioned at opposing ends of the stacking head. Sprocket 256a is coupled to actuator 253 via gear box 254. A belt 255 is routed around each of sprockets 256a, 256b and 303 to thereby cause each of screw assemblies 300 to be rotated when sprocket 256a is rotated. Belt 255 is routed around alternating sides of sprockets 303 so that each screw assembly 300 will be driven in a different direction from the immediately adjacent screw assembly. By employing sprocket 256b, belt 255 can be routed to cause one screw assembly 300 in a pair to be driven in the opposite direction from the other screw assembly 300 in the pair. For example, as depicted in FIG. 3A, belt 255 passes under both sprockets 303 in the leftmost pair of screw assemblies 300, then over both sprockets 303 in the next pair of screw assemblies 300, and so on.

Figure 3B:
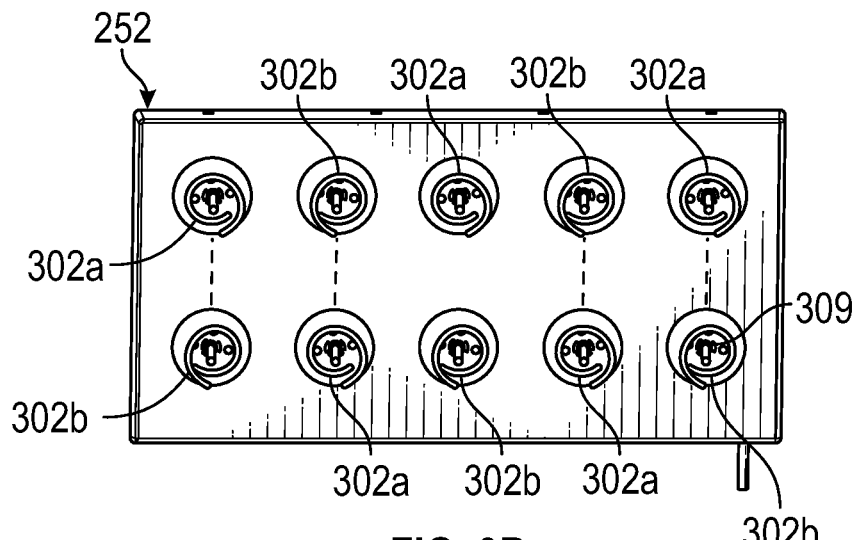
FIG. 3B provides a bottom view of the stacking head of FIG. 3.

Each screw assembly 300 includes a center stake 301 and a helical stake or "corkscrew" 302 that extend downwardly from lower frame 252. Corkscrew 302 is positioned around center stake 301 and rotates when sprocket 303 is driven. Both center stake 301 and corkscrew 302 may have a sharpened tip to facilitate piercing through sod. Because screw assemblies 300 are driven in different directions, corkscrew 302 can be either a left hand corkscrew 302a or a right hand corkscrew 302b as is shown in FIG. 3B. One benefit of using pairs of left hand and right hand corkscrews is that they offset the torque that is created when the corkscrews are rotated into the rolls.

Figure 3C:
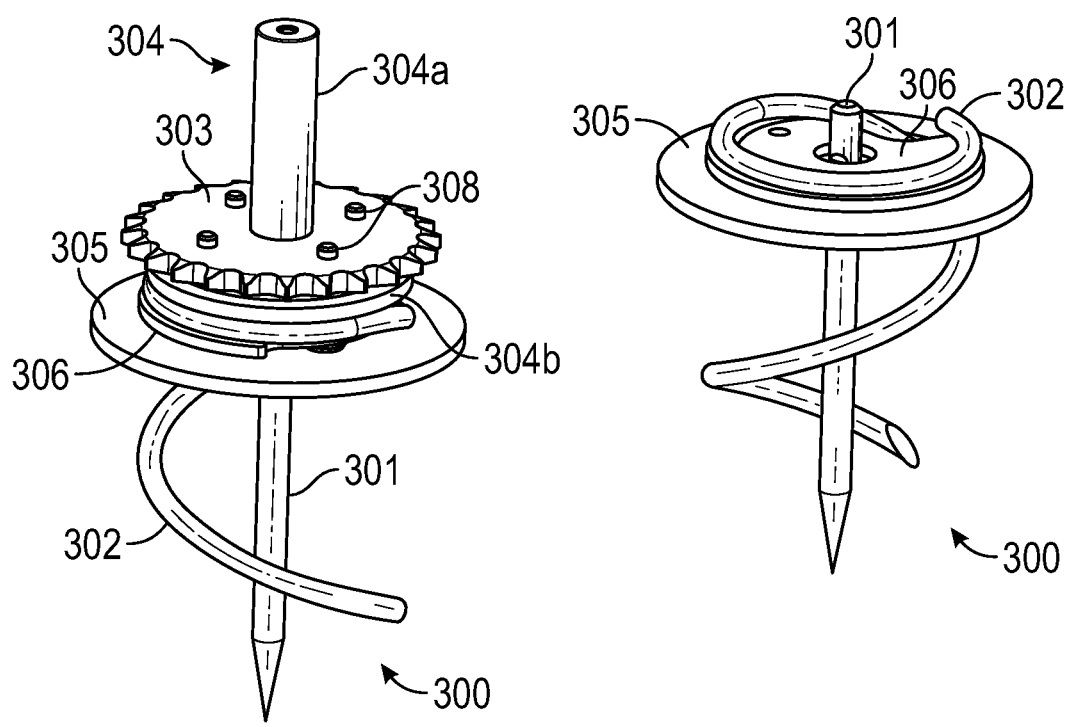
FIG. 3C provides isolated views of a screw assembly that can be used with the stacking head of FIG. 3.

FIG. 3C illustrates two isolated views of a screw assembly 300. As shown, each screw assembly 300 includes a shaft assembly 304 having a shaft 304a and a flange 304b. Flange 304b is positioned above lower frame 252. Each screw assembly 300 also includes a cover plate 305 that is positioned under or within lower frame 252 and is coupled to flange 304b to retain screw assembly 300 in the desired position relative to lower frame 252 (e.g., to prevent movement of center stake 301 and corkscrew 302 along the x and y axes relative to lower frame 252). Cover plate 305 includes an opening through which corkscrew 302 extends as well as an opening through which center stake 301 extends. Center stake 301 can insert into an opening in the bottom of shaft 304a and be secured therein via a snap ring 309 (see FIG. 3B) or any other suitable mechanism. Screw assembly 300 can also include a retaining plate 306 which sits below the portion of corkscrew 302 that is positioned above cover plate 305. Bolts 308 can be used to sandwich together sprocket 303, flange 304b, the upper portion of corkscrew 302, retaining plate 306 and cover plate 305. As is shown in FIGS. 3 and 3A, screw assembly 300 can also include flange bearings 307a and 307b which secure screw assembly 300 to upper frame 251 (via shaft 304a) and allow screw assembly 300 to rotate.

Figure 4A:
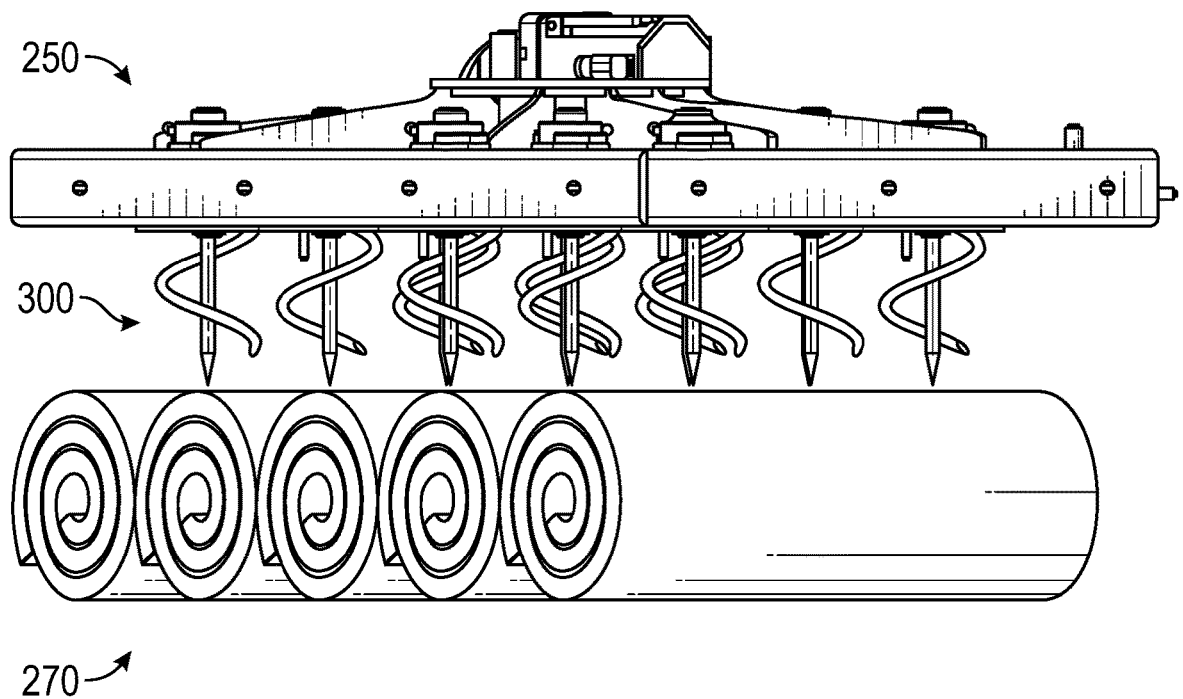
FIGS. 4A and 4B illustrate how the stacking head of FIG. 3 can secure and pick up rolls of sod.
Figure 4B:
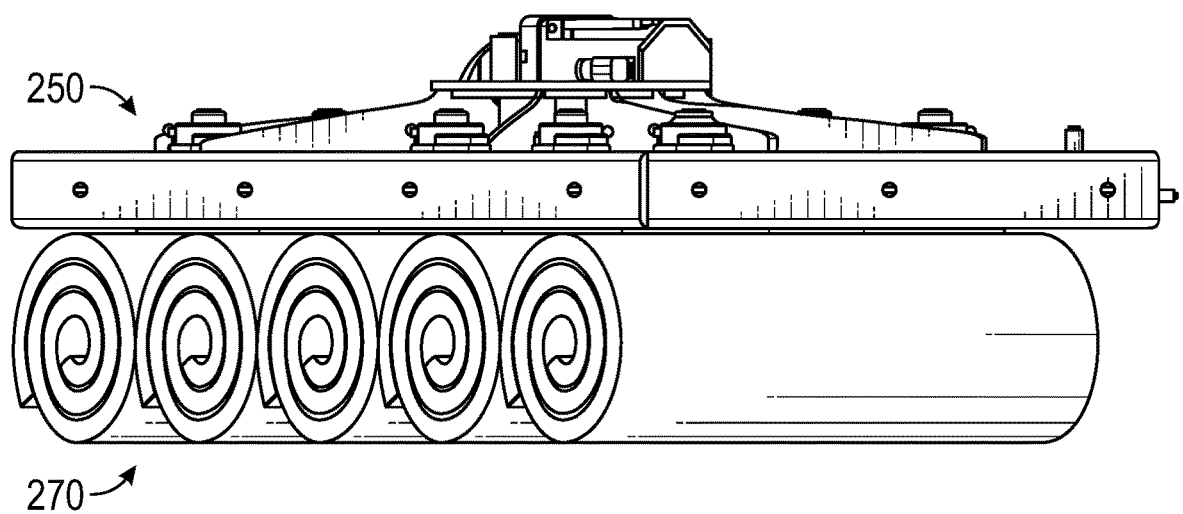
Figure 5:
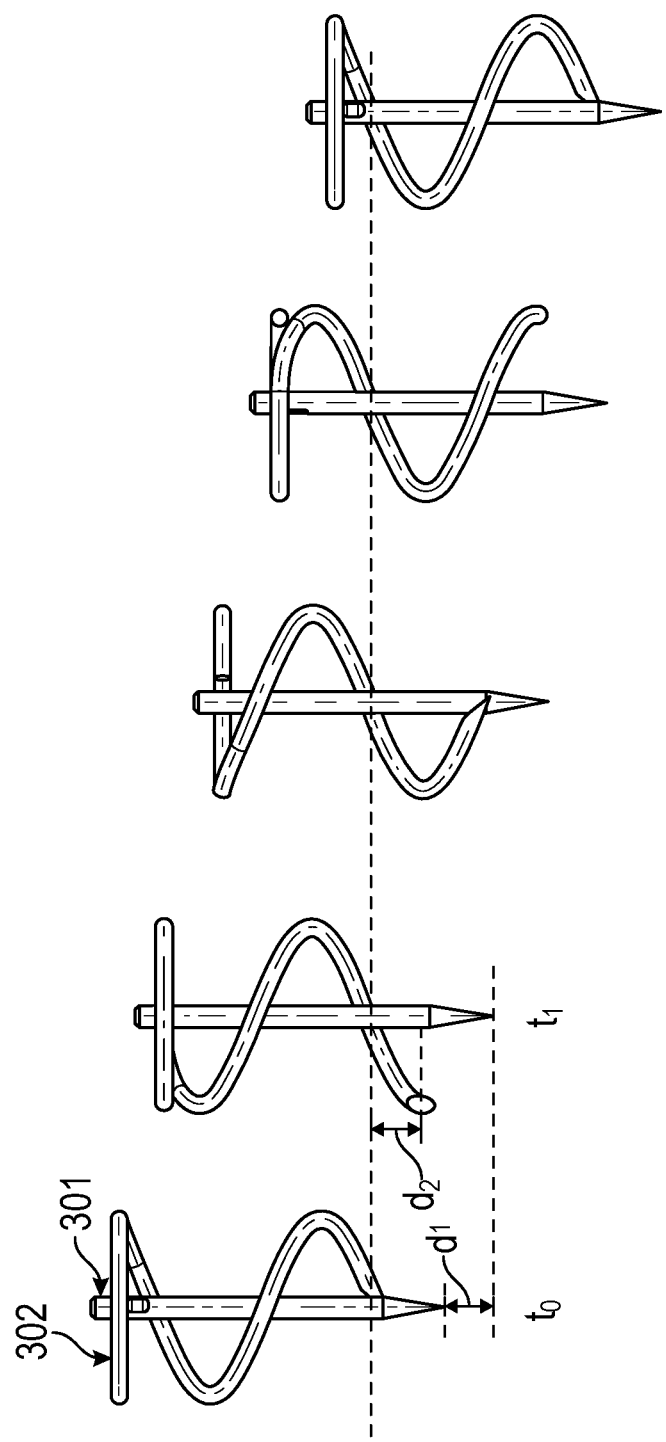
FIG. 5 illustrates how the rotation of each screw assembly can be synchronized with the vertical movement of the stacking head.

FIGS. 4A and 4B illustrate how stacking head 250 can be moved vertically relative to rolls 270 to cause screw assemblies 300 to pierce and secure rolls 270. FIG. 5 illustrates how screw assemblies 300 can be rotated during this vertical movement of stacking head 250. In accordance with embodiments of the present invention, each screw assembly 300 can be rotated synchronously with the vertical movement of stacking head 250. By synchronizing the rotation with the vertical movement, rolls 270 can be secured and removed from the stacking conveyor very quickly without damaging the delicate turf any more than is necessary.

FIG. 5 is intended to represent what is meant by synchronizing the rotation of corkscrew 302 with the vertical movement of stacking head 250. Although the following example will describe this vertical movement as downward movement of the stacking head 250, it is to be understood that vertical movement of stacking head 250 should be construed as relative to the stacking conveyor. Therefore, this vertical movement could be accomplished by elevating the stacking conveyor towards stacking head 250 with or without lowering stacking head 250.

When stacking head 250 descends towards rolls, corkscrews 302 will also descend. Therefore, absent rotation of corkscrews 302, this downward movement would result in corkscrews 302 punching circular holes through rolls 270. To address this problem, a stacking head could be configured to allow corkscrews 302 to pull the rolls towards stacking head 250 as corkscrews 302 rotate (or vice versa). In other words, in such cases, the stacking head would be free to descend but would not be forced downwardly. Although this technique would secure rolls 270, it is relatively slow, imprecise and may still cause unnecessary damage.

Unlike this "pulling" technique, stacking head 250 is configured to actively "push" screw assemblies 300 into rolls 270 while simultaneously rotating the screw assemblies at a rate that is synchronized with the stacking head's rate of descent. FIG. 5 is intended to illustrate what is meant by synchronized in this context.

FIG. 5 depicts a sequence of positions of a center stake 301 and a corkscrew 302 of a single screw assembly 300 while stacking head 250 is securing a roll. The horizontal line represents the top of the sod roll being secured. Accordingly, FIG. 5 depicts center stake 301 and corkscrew 302 being forced into a roll.

At time $t_0$, it is assumed that stacking head 250 has been lowered to the point that center stake 301 has pierced into the roll while the point of corkscrew 302 is about to pierce the roll. As shown, the tip of corkscrew 302 is positioned directly behind center stake 301 at time $t_0$. The speed at which stacking head 250 is moved vertically to reach this position and whether or not corkscrew 302 is rotating prior to reaching this position is unimportant. However, since corkscrew 302 is about to pierce the roll, the vertical movement and rotation going forward can be synchronized.

At time $t_1$, it is assumed that stacking head 250 has moved downwardly a distance $d_1$. For example, the sod harvester can include control circuitry that causes linear actuator 241 to drive scissor assembly 242 thereby causing stacking head 250 to move downwardly at a desired rate. Because the control circuitry knows the rate at which stacking head 250 is being forced towards rolls 270, it can also cause actuator 253 to rotate belt 255 at a rate that will cause corkscrew 302's "relative vertical displacement due to rotation" $d_2$ to match $d_1$. This control circuitry can be any suitable type of circuitry such as a processor, a microcontroller, an FPGA, an ASIC, a PLC, etc.

The term "relative vertical displacement due to rotation" is best understood with reference to FIG. 5. As mentioned above, at time $t_0$, the point of corkscrew 302 was positioned directly behind center stake 301 (or more specifically, directly behind the rotational axis of corkscrew 302). At time $t_1$, the rotation of corkscrew 302 has positioned the point directly to the left of center stake 301 (i.e., corkscrew 302 has been rotated 90°). At time $t_1$, the portion of corkscrew 302 that is directly behind center stake 301 is at a different vertical position relative to center stake 301 due to the rotation. The relative vertical displacement due to rotation can therefore be defined as the difference between the vertical position of a portion of corkscrew 302 that is currently at a particular position relative to the rotational axis of corkscrew 302 (e.g., relative to center stake 301 when screw assembly 300 includes center stake 301 and center stake 301 extends along the rotational axis) and the vertical position of a portion of corkscrew 302 that was previously at the same particular position. Accordingly, the relative vertical displacement due to rotation between times $t_0$ and $t_1$ equals $d_2$.

Another way that this synchronizing can be viewed is that corkscrew 302 is rotated at a rate that ensures that the portion of corkscrew 302 that is level with the top of the roll remains in the same position relative to center stake 301. For example, throughout the sequence shown in FIG. 5, the horizontal line defining the top of the roll aligns with the portion of corkscrew 302 that is positioned directly behind center stake 301 (i.e., the position directly behind center stake 301 is the "particular position relative to center stake 301" referenced above). More specifically, at time $t_0$, corkscrew 302 will form a hole in the top of the roll. Then, as center stake 301 and corkscrew 302 are forced further into the roll, corkscrew 302 is rotated at a rate that ensures that the portion of corkscrew 302 that is level with the top of the roll is positioned in this same hole. As a result, the hole that the point of corkscrew 302 creates will generally remain the same size even though stacking head 250, and therefore center stake 301 and corkscrew 302, are being pushed downwardly into the roll (as opposed to corkscrew 302 pulling the roll towards stacking head 250 or pulling stacking head 250 towards the roll).

If the rate at which stacking head 250 is driven downwardly is updated, the rate at which screw assemblies 300 are rotated can be updated accordingly and vice versa. Such updates can even be accomplished on the fly during operation of the sod harvester. Additionally, these rates need not be constant during the process of securing rolls. For example, with reference to FIG. 5, these rates could be slower between times $t_0$ and $t_1$ to ensure that center stakes 301 and corkscrews 302 enter the rolls cleanly (e.g., to minimize movement of rolls 270 as center stakes 301 and corkscrews 302 penetrate them), and may then be increased after time $t_1$ to shorten the amount of time required to secure the rolls.

Once stacking head 250 has secured rolls 270 in the manner described above, stacking head 250 can be moved (e.g., along the y axis and possibly along the x axis, z axis and/or rotationally) overtop the pallet where rolls 270 can be released. To release rolls 270, screw assemblies 300 can be driven in the opposite direction to withdraw corkscrews 302. In some embodiments, such as when rolls 270 are dropped onto the pallet from a position above the pallet or other rolls on the pallet, the reversing of corkscrews 302 alone can cause rolls 270 to fall from stacking head 250. However, in embodiments where stacking head 250 places rolls 270 onto the pallet or the previously stacked row of rolls, the same, albeit reverse, synchronization process can be performed to cause stacking head 250 to be lifted at a rate that is synchronized with the rate at which screw assemblies 300 are rotated. This will ensure that the lifting of stacking head 250 does not cause corkscrews 302 to rip through rolls 270.

To summarize, by synchronizing the rate of the stacking head's vertical movement with the rate of the screw assemblies' rotation, the stacking head can pick up and release rolls quickly, accurately and consistently without harming the delicate turf. Given that the stacking process is typically the bottleneck, by speeding up the stacking process, the present invention enables a sod harvester to be operated at higher ground speeds thereby increasing yield and efficiency.

Figure 6A:
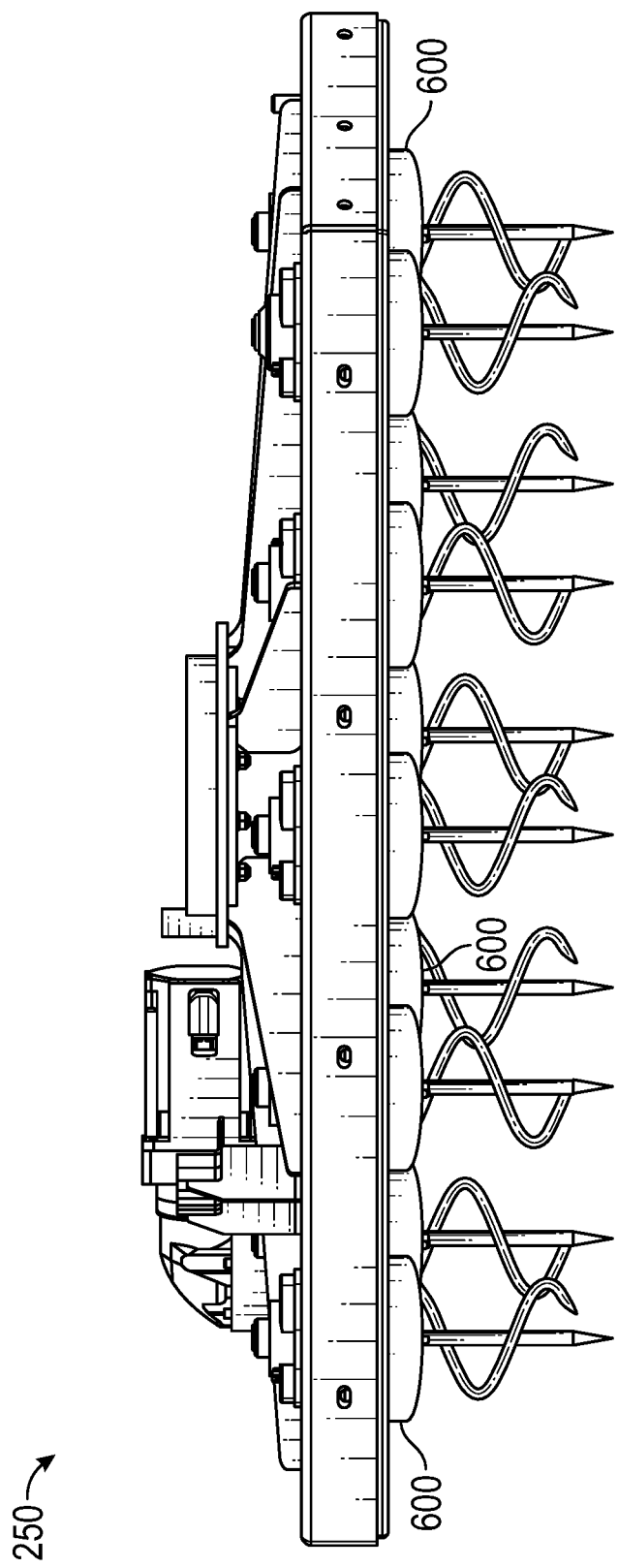
FIGS. 6A and 6B illustrate an embodiment of a stacking head where the screw assemblies include protrusions for forming depressions in the sod rolls.
Figure 6B:
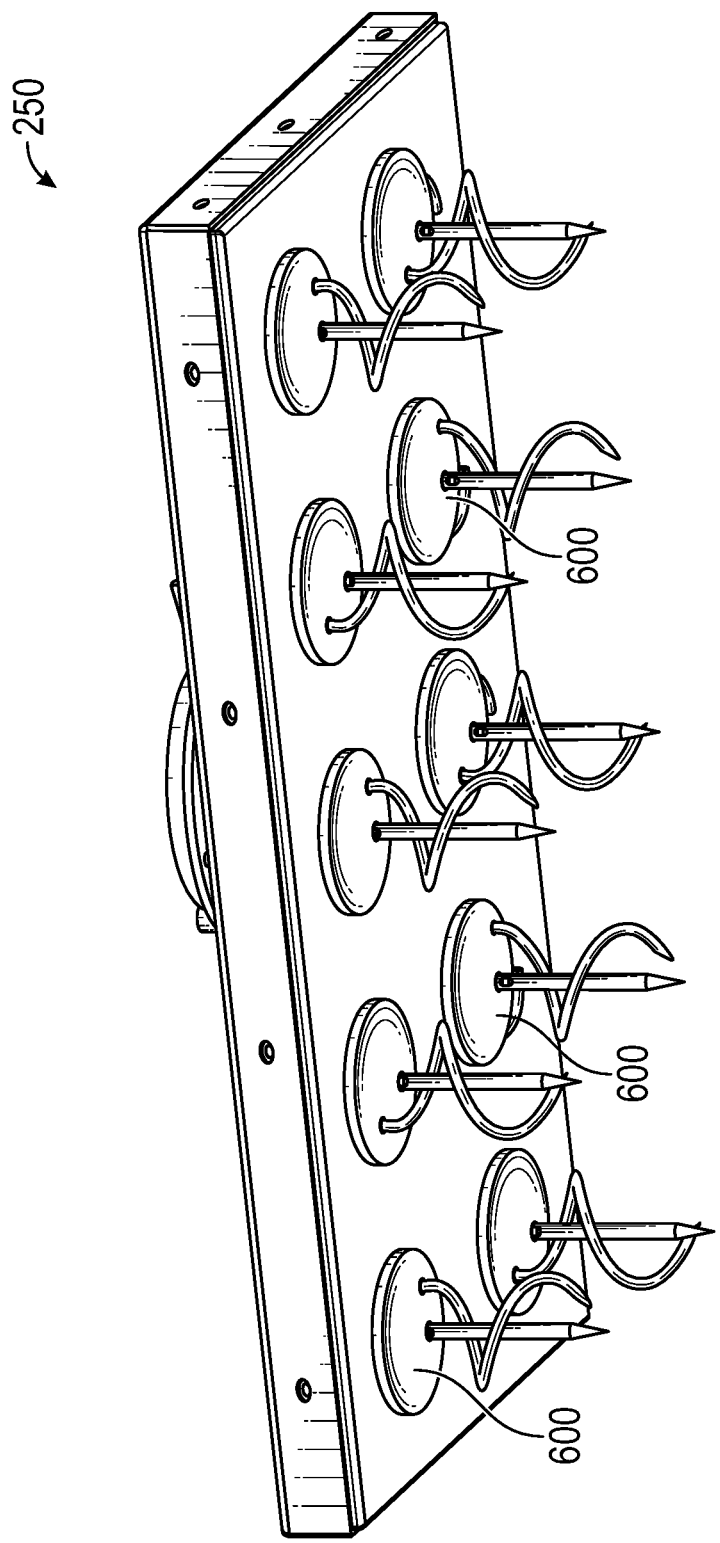

As shown in FIGS. 6A and 6B, in some embodiments, screw assemblies 300 can each include a protrusion 600 positioned around center stake 301 on the underside of lower frame 252. For example, cover plate 305 could be given a spherical shape or a separate spherically-shaped component could be attached underneath cover plate 305. Protrusions 600 function to form depressions in rolls 270 as stacking head 250 secures the rolls. In particular, as stacking head 250 is forced downwardly into rolls 270 and as screw assemblies 300 rotate, the top of each roll 270 will be forced towards lower frame 252 and against protrusions 600 thereby indenting the tops. Because each layer of rolls is typically stacked with a 90° offset relative to the lower layer, these depressions can function as pockets in which the subsequently stacked rolls may rest thereby minimizing the likelihood that a roll may fall off the pallet or away from its original placement.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for operating a stacking head of a sod harvester, the stacking head including a plurality of screw assemblies where each screw assembly comprises a corkscrew, the method comprising:
    detecting that a plurality of rolls of sod have been accumulated for stacking;
    driving the stacking head towards the rolls of sod at a first rate to cause each corkscrew to pierce one of the rolls of sod;
    while driving the stacking head towards the rolls of sod at the first rate, rotating the corkscrews at a second rate that is synchronized with the first rate such that the corkscrews are advanced into the rolls of sod by both driving the stacking head towards the rolls and rotating the corkscrews, wherein rotating the corkscrews at the second rate that is synchronized with the first rate comprises causing each corkscrew's relative vertical displacement due to rotation to match the stacking head's vertical displacement.

2. The method of claim 1, wherein driving the stacking head towards the rolls of sod comprises driving the stacking head downwardly.

3. The method of claim 1, wherein each screw assembly also comprises a center stake, and wherein rotating the corkscrews at the second rate causes a portion of each corkscrew that is level with a top surface of the corresponding roll of sod to remain in the same position relative to the corresponding center stake while the stacking head is driven towards the rolls of sod at the first rate.

4. The method of claim 1, further comprising:
    after the rolls of sod are secured to the stacking head, moving the stacking head overtop a pallet; and
    releasing the rolls of sod onto the pallet by rotating the corkscrews in a reverse direction.

5. The method of claim 4, wherein the corkscrews are rotated in a reverse direction at a rate that is synchronized with a rate at which the stacking head is driven upwardly.

6. The method of claim 5, wherein releasing the rolls of sod onto the pallet comprises positioning the stacking head overtop the pallet to cause the rolls of sod that are secured to the stacking head to be in contact with the pallet or rolls of sod that were previously stacked on the pallet and then rotating the corkscrew in the reverse direction while driving the stacking head upwardly.

7. The method of claim 1, wherein the first rate and the second rate are adjusted synchronously while the corkscrews are advanced into the rolls of sod.

8. The method of claim 7, wherein the first rate and the second rate are increased synchronously while the corkscrews are advanced into the rolls of sod.

9. The method of claim 1, wherein the plurality of screw assemblies comprises a plurality of pairs of screw assemblies, each pair being positioned to pierce the same roll of sod, and wherein the method includes rotating the corkscrews in each pair in different directions.

10. A stacker assembly for use on a sod harvester to stack rolls of sod, the stacker assembly comprising:
    a stacking head that is configured to move vertically relative to a stacking conveyor on which rolls of sod are accumulated, the stacking head including a plurality of screw assemblies, each screw assembly comprising a corkscrew that extends downwardly from the stacking head;
    circuitry for controlling the stacking head, the circuitry being configured to cause the stacking head to be driven towards the rolls of sod at a first rate and to cause each corkscrew to be rotated at a second rate that is synchronized with the first rate such that the corkscrews are advanced into the rolls of sod by both driving the stacking head towards the rolls and rotating the corkscrews, the circuitry rotating the corkscrews at the second rate that is synchronized with the first rate comprises to cause each corkscrew's relative vertical displacement due to rotation to match the stacking head's vertical displacement.

11. The stacker assembly of claim 10, wherein each screw assembly also comprises a center stake, and wherein rotating the corkscrews at the second rate causes a portion of each corkscrew that is level with a top surface of the corresponding roll of sod to remain in the same position relative to the corresponding center stake while the stacking head is driven towards the rolls of sod at the first rate.

12. The stacker assembly of claim 10, further comprising:
a first actuator that drives the stacking head towards the rolls; and
a second actuator that rotates the corkscrews;
wherein the circuitry provides signals to the first and second actuators to cause the stacking head to be driven towards the rolls of sod at the first rate and to cause each corkscrew to be rotated at the second rate that is synchronized with the first rate.

13. The stacker assembly of claim 10, wherein each screw assembly includes a sprocket that is driven by a belt to cause the corkscrews to rotate at the second rate, and wherein the belt is routed around the sprockets to cause each corkscrew to rotate in a different direction from an adjacent corkscrew.

14. The stacker assembly of claim 10, wherein each screw assembly includes a protrusion that extends downwardly from the stacking conveyor to thereby form depressions in the rolls of sod.

15. The stacker assembly of claim 10, wherein the circuitry is further configured to move the stacking head over a pallet after the rolls of sod are secured to the stacking head, and release the rolls of sod onto the pallet by rotating the corkscrews in a reverse direction.

16. The stacker assembly of claim 15, wherein the circuitry causes the corkscrews to be rotated in a reverse direction at a rate that is synchronized with a rate at which the stacking head is driven upwardly.

17. A stacking head for a sod harvester comprising:
a frame;
a first actuator that is configured to drive the frame in a vertical direction;
a plurality of screw assemblies housed within the frame, each screw assembly comprising a center stake and a corkscrew that is positioned around the center stake;
a second actuator that is coupled to each of the screw assemblies, the actuator being configured to rotate the screw assemblies; and
control circuitry that is configured to cause the first actuator to drive the frame in the vertical direction at a first rate and to cause the second actuator to rotate the corkscrews at a second rate that is synchronized with the first rate to thereby cause the center stakes and the corkscrews to be advanced into rolls of sod.

18. The stacking head of claim 17, wherein rotating the corkscrews at the second rate that is synchronized with the first rate comprises causing each corkscrew's relative vertical displacement due to rotation to match the stacking head's vertical displacement.

* * * * *